United States Patent
Shang et al.

(10) Patent No.: US 12,184,733 B2
(45) Date of Patent: Dec. 31, 2024

(54) COMMUNICATION METHOD, SYSTEM, ELECTRONIC DEVICE AND READABLE STORAGE MEDIUM

(71) Applicant: HANGZHOU QULIAN TECHNOLOGY CO., LTD., Zhejiang (CN)

(72) Inventors: Xuan Shang, Zhejiang (CN); Maifang Hu, Zhejiang (CN); Yuan Tao, Zhejiang (CN); Fanglei Huang, Zhejiang (CN); Kejie Zhang, Zhejiang (CN)

(73) Assignee: HANGZHOU QULIAN TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 17/921,502

(22) PCT Filed: Aug. 11, 2022

(86) PCT No.: PCT/CN2022/111762
§ 371 (c)(1),
(2) Date: Oct. 26, 2022

(87) PCT Pub. No.: WO2023/115982
PCT Pub. Date: Jun. 29, 2023

(65) Prior Publication Data
US 2024/0223664 A1 Jul. 4, 2024

(30) Foreign Application Priority Data
Dec. 24, 2021 (CN) .......................... 202111599322.9

(51) Int. Cl.
*H04L 67/141* (2022.01)
*G06F 16/27* (2019.01)

(52) U.S. Cl.
CPC ............ *H04L 67/141* (2013.01); *G06F 16/27* (2019.01)

(58) Field of Classification Search
CPC ............................. H04L 67/141; G06F 16/27
See application file for complete search history.

(56) References Cited

U.S. PATENT DOCUMENTS

2006/0227769 A1  10/2006  Veits
2009/0003243 A1  1/2009  Vaswani et al.
(Continued)

FOREIGN PATENT DOCUMENTS

CN         1788480 A      6/2006
CN       102822242 A     12/2012
(Continued)

OTHER PUBLICATIONS

European search report for EP 22789151, prepared by the European Patent Office, Date of completion Mar. 6, 2024.

*Primary Examiner* — Minh Chau Nguyen
(74) *Attorney, Agent, or Firm* — Brooks Kushman P.C.

(57) ABSTRACT

Provided is a method for communication, which includes steps of: receiving a first information from a first node via a first connection with the first node; and transmitting a first information to at least one other node. A connection initiator of the first connection is the first node. The first information includes an address of the first node within a target network domain, the target network domain is a network domain in which the at least one other node is located, and the at least one other node is a node other than a second node in a network partition to be joined by the first node. The address of the first node within the target network domain is used by the first node to establish a connection with the at least one other node.

20 Claims, 7 Drawing Sheets

(56) References Cited

U.S. PATENT DOCUMENTS

| | | | |
|---|---|---|---|
| 2018/0152277 A1 | 5/2018 | Chen et al. | |
| 2019/0199787 A1* | 6/2019 | Carver | H04L 67/568 |
| 2019/0340267 A1* | 11/2019 | Vo | G06F 16/2365 |
| 2020/0120023 A1* | 4/2020 | Munson | H04L 41/20 |
| 2020/0154339 A1 | 5/2020 | Singh et al. | |
| 2021/0075590 A1 | 3/2021 | Yang et al. | |
| 2023/0036439 A1* | 2/2023 | Olson | H04L 9/3236 |

FOREIGN PATENT DOCUMENTS

| | | |
|---|---|---|
| CN | 110266763 A | 9/2019 |
| CN | 110445850 A | 11/2019 |
| CN | 110708383 A | 1/2020 |
| CN | 110891082 A | 3/2020 |
| CN | 111224829 A | 6/2020 |
| CN | 111598564 A | 8/2020 |
| CN | 112910660 A | 6/2021 |
| WO | 2019010459 A1 | 1/2019 |
| WO | 2019142049 A1 | 7/2019 |

\* cited by examiner

COMMUNICATION METHOD, SYSTEM, ELECTRONIC DEVICE AND READABLE STORAGE MEDIUM

CROSS-REFERENCE TO RELATED APPLICATION

This application is the national phase entry of International Application No. PCT/CN2022/111762, filed on Aug. 11, 2022, which is based upon and claims priority to the Chinese Patent Application No. 202111599322.9, filed on Dec. 24, 2021, the entire contents of which are incorporated herein by reference.

FIELD

The present application relates to the field of blockchain technology, and in particular, to a communication method, a system, an electronic device, and a readable storage medium.

BACKGROUND

A consortium blockchain, is a type of blockchain. The consortium blockchain is only for members of a specific group and a limited number of third parties, and multiple pre-selected nodes in the consortium blockchain are designated as bookkeepers, and the generation of each block is jointly decided by all the pre-selected nodes. In an application process of the consortium blockchain, across-domain communicate is required. In related technologies, the cross-domain communication of consortium blockchains is mainly realized by NAT (Network Address Translation) penetration technology. However, NAT penetration technology has the problem of low security, thus, some organizations corresponding to nodes in the consortium blockchain want to communicate with external network domains through proxy.

On the other hand, node discovery is a very important technique in blockchain networks. When a new node joins the network through a known node, the new node knows limited information about the network nodes, and through the node discovery, the new node is able to learn more nodes and thus establish enough connections.

In view of the above two aspects, it is necessary to research the method for network communication based on the node discovery for a scenario that the proxy communication is used in the consortium blockchain, to satisfy user requirements.

SUMMARY

The present application provides a method for communication, a system, an electronic device and a readable storage medium, which realizes a self-discovery of nodes in the scenario of using the proxy communication in the consortium blockchain, and satisfies the user requirements.

In accordance with a first aspect of embodiments of the present application, a method for communication is provided, the method includes steps of: receiving a first information from a first node via a first connection with the first node, where the first connection includes a logical connection, a connection initiator of the first connection is the first node, the first information includes an address of the first node within a target network domain, the target network domain is a network domain in which at least one other node is located, the at least one other node is a node other than a second node in a network partition to be joined by the first node, the address of the first node within the target network domain is used by the first node to establish a connection with the at least one other node; and transmitting the first information to the at least one other node.

In accordance with a second aspect of embodiments of the present application, a method for communication is provided, the method includes steps of: obtaining a first information, where the first information includes an address of a first node within a target network domain, the target network domain is a network domain in which at least one other node is located, the at least one other node is a node other than a second node in a network partition to be joined by the first node, the address of the first node within the target network domain is used by the first node to establish a connection with the at least one other node; and transmitting the first information to the second node via a first connection with the second node, where the first connection includes a logical connection, and a connection initiator of the first connection is the first node.

In accordance with a third aspect of embodiments of the present application, a method for communication is provided, the method includes steps of: receiving, by a third node, an address of a first node within a target network domain from a second node, where the target network domain is a network domain in which at least one other node is located, the at least one other node is a node other than the second node in a network partition to be joined by the first node, the at least one other node includes the third node; and establishing, by the third node, a connection with the first node according to the address of the first node within the target network domain. The at least one other node and the second node belong to the same network partition, that is, the network partition to be joined by the first node.

In accordance with a fourth aspect of embodiments of the present application, a device for communication in a consortium blockchain is provided, which may be a second node or a device (such as a chip or a processing circuit) applied in the second node. The device includes a first receiver module and a first transmitter module. The first receiver module is configured to receive a first information from a first node via a first connection with the first node. The first connection includes a logical connection, and a connection initiator of the first connection is the first node.

The first information includes an address of the first node within a target network domain, the target network domain is a network domain in which at least one other node is located, and the at least one other node is a node other than a second node in the network partition to be joined by the first node. The address of the first node within the target network domain is used by the first node to establish a connection with the at least one other node. The first transmitter module is configured to transmit the first information to the at least one other node.

In accordance with a fifth aspect of embodiments of the present application, a device for communication in a consortium blockchain is provided, which may be a first node or a device (such as a chip or a processing circuit) applied in the first node. The device includes an acquisition module and a second transmitter module. The acquisition module is configured to obtain a first information. The first information includes an address of the first node within a target network domain. The target network domain is a network domain in which at least one other node is located, and the at least one other node is a node other than a second node in a network partition to be joined by the first node. The address of the first node within the target network domain is used to establish a connection between the first node and the at least one other node. The second transmitter module is configured to transmit the first information to the second node via a first connection with the second node. The first connection includes a logical connection, and a connection initiator of the first connection being the first node.

In accordance with a sixth aspect of embodiments of the present application, a system for communication in a consortium blockchain is provided, which includes a first node and a second node. The second node is applied to perform any of the methods in accordance with the above first aspect, and the first node is applied to perform any of the methods in accordance with the above second aspect.

In an optional embodiment of the present application, the above-described system for communication in a consortium blockchain may also include at least one other node. The at least one other node belongs to the same network partition as the second node, and that network partition is the network partition to be joined by the first node.

In accordance with a seventh aspect of embodiments of the present application, a computer equipment is provided, which includes a memory, a processor, and a computer program stored in the memory and executable on the processor. The processor is configured to execute the computer program to implement any of the methods for communication in accordance with the above first aspect, or to implement any of the methods for communication in accordance with the above second aspect.

In accordance with an eighth aspect of embodiments of the present application, a computer readable storage medium is provided, in which a computer program is stored, the computer program when being executed by a processor, the method for communication in accordance with the above first aspect, or the method for communication in accordance with the above second is implemented.

In the method for communication, the system, the electronic device, and the computer readable storage medium provided by the present application, a first information transmitted by a first node is received by a second node through a first connection with the first node, the first information is transmitted by the second node to other nodes. The first information includes an address of the first node within a target network domain in which at least one other node is located, and thus the other node, after receiving the address of the first node within the target network domain in which at least one other node is located, is enabled to establish a connection with the first node based on that address. In this embodiment, the first node takes the initiative to transmit the first information to the second node, that is, in this embodiment, the self-discovery of nodes in the scenario of communication using proxy in the consortium blockchain is achieved through the node discovery technique in the form of PUSH, which satisfies the user requirements. Moreover, the consortium blockchain itself is more stringent for node identity verification, the node discovery in the form of PUSH can avoid Eclipse attacks and Sybil attacks, etc. in the consortium blockchain, and has higher security. Furthermore, in the method provided in this embodiment, the first information, when being broadcast by the second node, is only broadcast to the nodes (i.e., the other nodes) in in the network partition to be joined, thus the first node is connected only to the other nodes in the network partition to be joined, thereby realizing partition isolation of node discovery, which not only satisfies the self-discovery of nodes in the scenario of communication between multiple network partitions in the consortium blockchain, but also the partition isolation of node discovery does not cause confusion in business execution, which further satisfies user requirements.

BRIEF DESCRIPTION OF DRAWINGS

In order to illustrate solutions in the embodiments of the present application more clearly, the following will briefly introduce the drawings that need to be used in description of the embodiments or the existing technologies. Obviously, the drawings in the following description are only some embodiments of the present application. For those of ordinary skill in the art, other drawings may also be obtained according to these drawings without any creative effort.

DETAILED DESCRIPTION OF EMBODIMENTS

In order to make the objectives, schemes and beneficial effects of the present application more comprehensible, the present application will be described in further detail below with reference to the drawings and embodiments. It should be understood that specific embodiments described herein are intended to interpret the present application only and are not intended to limit the present application.

It would be understood that the terms "first", "second", "third", "fourth", etc. (if present) in the embodiments of the present application are used to distinguish between similar objects and are not necessarily to describe a particular order or sequence.

It would be understood that the term "and/or" as used in the present application refers to any and all possible combinations of one or more of the items listed in association, and includes such combinations.

Before giving a detailed explanation of the embodiments of the present application, the application scenarios of the embodiments of the present application are described.

Methods provided in embodiments of the present application may be applied to a system for communication in a consortium blockchain, and the application scenarios of the system for communication in a consortium blockchain include, but are not limited to, commodity traceability, public welfare charity, supply chain finance, e-government, mutual insurance, or Internet of things, etc. This application does not have any restrictions on this.

Figure 1:
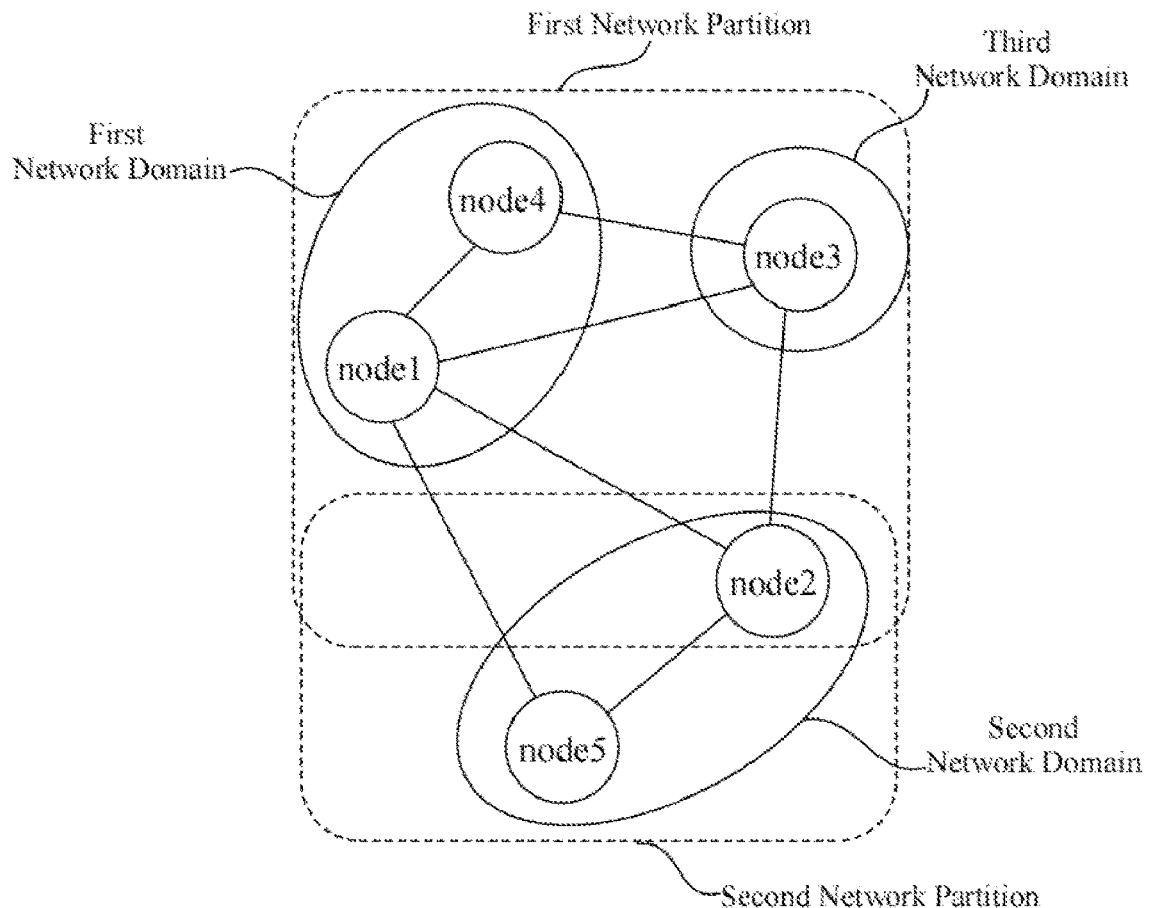
FIG. 1 is a network topology diagram of a device for communication in a consortium blockchain according to an embodiment of the present application.

Exemplarily, FIG. 1 shows a network topology diagram of a system for communication in a consortium blockchain (referred to as a communication system, hereinafter) provided by an exemplary embodiment of the present application. As shown in FIG. 1, the communication system includes a plurality of network domains, and at least one blockchain node (referred to as a node, hereinafter) is provided in each network domain. Optionally, the nodes involved in the embodiments of the present application correspond to various organizations in the consortium blockchain, which may be servers or terminals.

Concepts and definitions involved in the embodiments of the present application are as follows.

Cross-domain communication: communication between nodes in different network domains, such as, a communication between node 1 and node 2 in FIG. 1.

Neighbor node: a node that has a neighbor relationship with a certain node is referred to as a neighbor node of that node. As shown in FIG. 1, the neighbor nodes of node 1 include node 2, node 3, node 4 and node 5; the neighbor nodes of node 2 include node 1, node 3 and node 5.

Home domain: a domain in which a node is located is referred to as a home domain of that node.

Related domain: for a certain node, non-local network domains of the neighbor nodes of the certain node is referred to as related domains of that node. As shown in FIG. 1, the related domains of node 1 include a second network domain and a third network domain, the related domains of node 2 include a first network domain and the third network domain, and the related domains of node 3 include the first network domain and the second network domain.

Network partition: to provide different services to the organizations corresponding to the nodes in the network, the network is divided into multiple zones, and each zone is referred to as a network partition. One or more nodes may be included in each network partition. Nodes in the same network partition can communicate with each other, and nodes in different network partitions cannot communicate with each other. As shown in FIG. 1, node 1, node 2, node 3 and node 4 belong to a first network partition, and node 2 and node 5 belong to a second network partition. Interconnected nodes in the first network partition can communicate with each other, and interconnected nodes in the second network partition can communicate with each other, but nodes in the first network partition and nodes in the second network partition cannot communicate directly. For example, node 1 and node 5 do not belong to the same network partition and cannot communicate directly.

Figure 2:
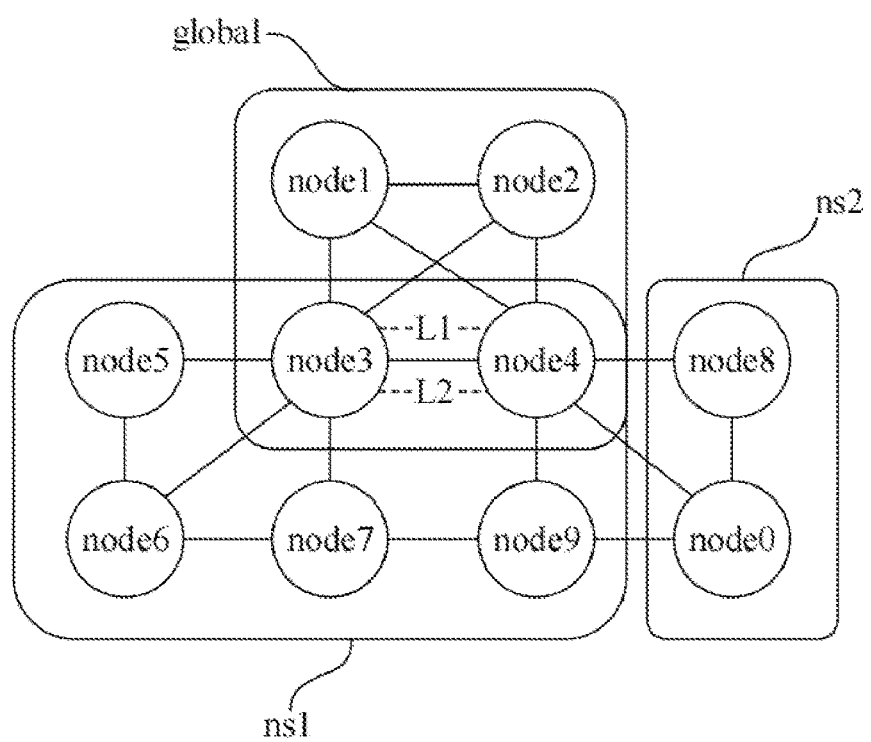
FIG. 2 is a network topology diagram of a system for communication in a consortium blockchain according to another embodiment of the present application.

Exemplarily, FIG. 2 shows a network topology diagram provided in another embodiment of the present application. As shown in FIG. 2, the network includes a total of 10 nodes from node 0 to node 9, including three network partitions: ns1, ns2, and global. In ns1, node 3, node 4, node 5, node 6, node 7, and node 9 are included. In ns2, node 0 and node 8 are included. In global, node 1, node 2, node 3 and node 4 are included. Take node 4 as an example, node 4 can communicate with node 1, node 2, node 3 and node 9, but cannot communicate with node 8 and node 0.

Physical connection: a connection achieved by using the physical properties of an object. Physical connections enable physical network communication between nodes. Physical connections are the basis for logical connections.

Logical connection: built on the basis of physical connection. That is, if a logical connection is established between two nodes, a physical connection is necessarily established. However, if a physical connection is established between two nodes, a logical connection may not be established.

By establishing a logical connection, the communication of business messages between nodes can be realized. If no logical connection is established and only a physical connection is established, only messages related to the establishment of connection and activating messages can be transmitted and received between two nodes, but not business messages. Even if a business message is mistakenly transmitted by one node, the business message will not be received by an opposite node, and the business messages can be transmitted and received only when a logical connection is further established based on the establishment of physical connection. For a logical connection, a node identity verification is required, and once a node finds that the opposite node is an invalid node, the logical connection and the physical connection are immediately disconnected by the node.

In addition, in a network topology that includes multiple network partitions, there is one and only one physical connection between two nodes, however, there may be multiple logical connections. For example, in FIG. 2, node 3 and node 4 belong to both the first network partition and the third network partition. There is one and only one physical connection between node 3 and node 4. However, there may be two logical connections L1 and L2 between node 3 and node 4, where the logical connection L1 is configured for communication in the first network partition and logical connection L2 is configured for communication in the third network partition.

As shown in FIG. 1, in an application process of the consortium blockchain, the cross-domain communication is involved. In related technologies, the cross-domain communication is mainly realized by NAT penetration technology. However, due to the special characteristics of the consortium blockchain, some organizations in the consortium blockchain have higher requirements for the security of the network, and thus, these organizations want to communicate with the outside (other network domains) through proxy, i.e., the internal and external URLs of nodes are mapped by proxy for internal and external network communication, to hide the internal IP address of the organization. As a result, an organization may use different IP addresses to connect to organizations in different network domains, for example, if reverse proxies are used.

In other words, a node in a communication system will have multiple IP addresses for nodes in multiple network domains to communicate at the same time. For example, node 1 in FIG. 1 has IP address A for communication with nodes in the first network domain and IP address B for communication with nodes in the second network domain.

At present, many consortium blockchains do not consider the scenario that organizations need to communicate through proxy, so it is necessary to research the communication between nodes in consortium blockchains, for this need of users, including research on the discovery technology of nodes in consortium blockchains.

In blockchain networks, node discovery is a very important technology. Imagine that without node discovery technology, there are hundreds of nodes in a huge network, and if a new node needs to join the network, the IP addresses of these hundreds of nodes must be configured. This would be very complex and time consuming. The node discovery technique can solve this problem. When a new node joins the network, only the IP addresses of a few nodes in the network needs to be configured, and after the new node establishes a connection with these few nodes, other nodes in the network can be discovered by the new node through node discovery and the connections between the new node and the other nodes can be established.

In the related technologies, node discovery functions have been implemented in some blockchain projects, but none of these node discovery technologies can be applied to the scenario that the proxy communication is used in the consortium blockchain.

On the other hand, in the consortium blockchain, there may be multiple network partitions, and there are cross-network partitions in the communication process. As mentioned above, the business messages between different network partitions are isolated, and this application scenario is another limitation for the research on node discovery.

In view of the above aspects, the embodiments of the present application aim to conduct research on methods for discovering and connecting the nodes in the scenario that the proxy communication is used in a consortium blockchain and multiple network partitions may exist for communication, to meet the multiple needs of the users in actual use.

Solutions in the present application will be described in detail below with reference to FIG. 1. It should be noted that the different features in the present application may be combined with each other without conflict.

The method for communication provided in this embodiment is used to realize the connection of node 1 with nodes that need to be connected in a to-be-joined network partition. That is, in this embodiment, node 1 is a newly-joined node, for example, and the network partition to be joined by node 1 is referred to as the to-be-joined network partition. The to-be-joined network partition includes node 2 and at least one other node (i.e., node 2 and at least one other node belong to the network partition to be joined by node 1).

Specifically, referring to FIG. 1, in the following embodiment, the method for communication is illustrated with node 1 as a newly-joined node and a first network partition as the to-be-joined network partition. As shown in FIG. 1, at least one other node may include node 3 and node 4. The network domain to which each node belongs is shown in FIG. 1. the method for communication provided in this embodiment is used to realize the connection of node 1 with node 2, and node 4 among the other nodes.

It should be noted that this embodiment is illustrated with the example of node 1 joining the first network partition. However, the method provided in this embodiment is applicable to a communication system that includes one or more network partitions. For other newly-joined nodes in the communication system, as well as other network domain partitions that node 1 needs to join, references may be made to the process of this embodiment, which will not be repeatedly described in the present application.

Figure 3:
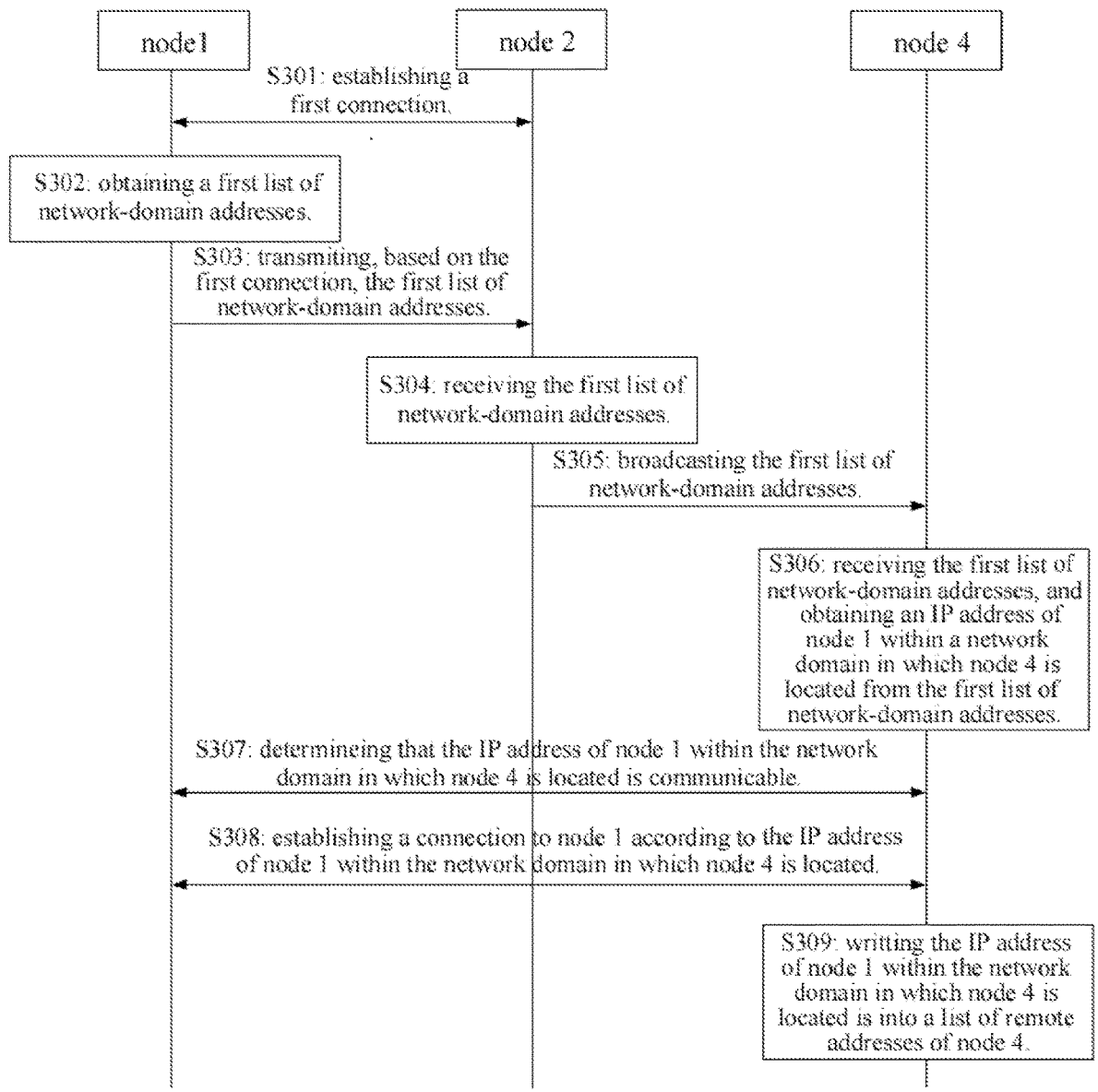
FIG. 3 is a flow diagram of a method for communication according to an embodiment of the present application.

Exemplarily, FIG. 3 illustrates a schematic flowchart of the method for communication provided in the present application. As shown in FIG. 3, the method may include steps S301 to S309.

In step S301, a first connection is established between node 1 and node 2. The first connection includes a logical connection. Node 1 is a connection initiator of the first connection, and node 2 is a connection receiver of the first connection.

The connection initiator (or referred to as an initiator node), i.e., the party of the two nodes that transmits a connection request, and the connection receiver (or referred to as a receiver node), i.e., the party of the two nodes that receives and responds to the connection request. It should be noted that a node connection collision may occur between two nodes in the process of connection, i.e., the two nodes initiate connection requests to each other at the same time. When a node connection collision occurs, according to a predetermined rule, one of the two nodes will drop the connection request and receive the connection request transmitted by the opposite node, thereby establishing the connection. In this embodiment, since node 2 runs in the network and does not know the IP address of node 1, in this case, node 1 is bound to act as the connection initiator and the problem of connection collision will not occur.

Optionally, a connection request may be initiated by node 1 to node 2 based on the IP address of node 2 (referred to as a first IP address, hereinafter) in a list remote addresses of node 1. The first IP address may be obtained by user configuration.

Specifically, a proxy node of node 2 may be configured by a user to obtain a first IP address capable of being connected by node 1, and then the first IP address is configured in the list of remote addresses of node 1. After the user completes the configuration and starts the node, a connection request is initiated by node 1 to node 2 based on the first IP address in the list of remote addresses of node 1, and node 2 responds to the connection request to establish the first connection.

It should be noted that, depending on actual use requirements, the IP addresses involved in embodiments of the present application may be IP addresses provided by proxy (including forward proxy and reverse proxy) nodes, or IP addresses provided by NAT gateways, which will not be limited in here, and in the following embodiments, the sources of each IP address will not be repeated.

In step S302, a first list of network-domain addresses is obtained by node 1. The first list of network-domain addresses is configured to characterize the IP address of node 1 within at least one network domain. The first list of network-domain addresses includes the IP address of node 1 within the network domain in which at least one other node is located.

It should be noted that, in the embodiments of the present application, the IP address of a certain node within a certain network domain is the IP address of that node for communication connections of nodes in that network domain. For example, IP address A of node 1 within the first network domain refers to the IP address of node 1 for the communication connection of the nodes in the first network domain. In other words, the node in the first network domain is communicatively connected to the node 1 through the IP address A.

Optionally, the first list of network-domain addresses may include IP addresses of node 1 within the home domain and related domains of node 1, and other nodes may be located in the home domain of node 1 or in the related domains of node 1. The first list of network-domain addresses includes at least the IP address of node 1 within the network domain in which one other node is located. Each IP addresses in the first list of network-domain addresses may be obtained by user configuration. The process of configuration is similar to that described above for the list of remote addresses of node 1, which will not be repeated here.

Referring to FIG. 1, node 1 is located in the first network domain, and the associated domains of node 1 include the second network domain and the third network domain. The first list of network-domain addresses may include the IP address of node 1 within the first network domain, and the IP address in the second network domain. For example, the first list of network-domain addresses may be: {domain1: 10.10.1.1:50011, domain2:117.10.11.1:50012, domain3: 117.10.11.1:50013}. In the first list of network-domain addresses, domain1 denotes the first network domain, domain2 denotes the second network domain, and domain3 denotes the third network domain. That is, the IP address provided by node 1 to node 4 within the first network domain for connection is 10.10.1.1:50011, the IP address provided by node 1 to node 2 and node 5 within the second network domain for connection is 117.10.11.1:50012, and the IP address provided by node 1 to node 3 within the third network domain for connection is 117.10.11.1:50013. That is, the first list of network-domain addresses includes the IP addresses of node 1 within the network domain in which other nodes, such as node 3 and node 4, are located.

In step S303, the first list of network-domain addresses is transmitted by node 1 to node 2 based on the first connection.

It can be understood that node 1 may store the first list of network-domain addresses in a memory of node 1 while transmitting the first list of network-domain addresses.

In step S304, the first list of network-domain addresses is received by node 2.

In step S305, the first list of network-domain addresses is broadcast by node 2 to each node in the first network partition.

Optionally, the first list of network-domain addresses may be broadcast by node 2 to all nodes in the first network partition using the Gossip protocol. It should be noted that node 2, as the receiver of the first connection, broadcasts the first list of network-domain addresses to all nodes in the first network partition, and not to the neighbor nodes of node 2. The Gossip protocol is used by node 2 to periodically select some nodes randomly to deliver the first list of network-domain addresses, such that the redundant messages in the network can be reduced.

The first list of network-domain addresses is received, by other nodes, and the IP address of node 1 within the network domain of other nodes is obtained from the first list of network-domain addresses. Node 4 among other nodes in FIG. 1 is taken as an example in the following description. Other nodes have the same process as node 4 which will not be repeated here.

In step S306, the first list of network-domain addresses is received, by node 4, and the IP address of node 1 within the network domain in which node 4 is located is obtained from the first list of network-domain addresses.

That is, the IP address of node 1 within the first network domain is looked up from the first list of network-domain addresses by node 4. If the IP address of node 1 within the first network domain is not included in the first list of network-domain addresses, the message (the received first list of network-domain addresses) is discarded by node 4; and if the IP address of node 1 within the first network domain is included in the first list of network-domain addresses, then the step S307 is performed.

In step S307, it is determined by node 4 whether the IP address of node 1 within the network domain in which node 4 is located is communicable.

Specifically, a connection request may be initiated by node 4 to the IP address of node 1 within the network domain in which node 4 is located to determine whether a communication with node 1 is possible through that IP address. If a response or feedback is received from the other party after initiating the connection request, then it is determined that the IP address of node 1 is communicable. Otherwise, it is determined that the IP address of node 1 is not communicable. In this implementation, the communicability of the IP address is determined by node 4 before establishing a connection to reduce useless messages and communications, which improves a connection efficiency.

If it is determined by node 4 that the IP address is not communicable, the IP address is discarded by node 4; and if it is determined by node 4 that the IP address is communicable, then the step S308 performed.

In step S308, a connection with node 1 based on the IP address of node 1 within the network domain in which node 4 is located is established by node 4.

Through the above process, node 1 is able to achieve the discovery and connection to node 3 and node 4. In the above process, the first list of network-domain addresses of node 1 is actively transmitted by node 1 to node 2, thus the above node-discovery process is a node discovery in the form of PUSH. In this embodiment, the self-discovery of nodes in the scenario of communication using proxy in the consortium blockchain is achieved through the node discovery technique in the form of PUSH, which satisfies the user requirements. Also, the consortium blockchain itself is more stringent for node identity verification, the node discovery in the form of PUSH can avoid Eclipse attacks and Sybil attacks, etc., in the consortium blockchain, and has higher security.

Moreover, the method provided in this embodiment is applicable to a network system that includes a single network partition and also to a network system that includes multiple network partitions, meeting different needs of the user with high applicability. Furthermore, in the method provided in this embodiment, the first list of network-domain addresses, when being broadcast by node 2, is only broadcast to the nodes in the first network partition, thus node 1 is connected only to the other nodes in the first network partition, thereby realizing partition isolation of node discovery, which not only satisfies the self-discovery of nodes in the scenario of communication between multiple network partitions in the consortium blockchain, but also the partition isolation of node discovery does not cause confusion in business execution, and thus the user requirements can be further satisfied.

In addition, as in the above embodiment, each node in the first network partition may be located in the same network domain or in different network domains, and thus the method provided in this embodiment can be applied not only to a network system including only one network domain, but also to a network system including multiple network domains, i.e., the method provided in this embodiment can achieve node discovery and connection in cross-domain communication, which further satisfies the network establishment requirement of the user in cross-domain communication scenarios and improves user experience.

In one embodiment, the method also includes a step S309 after the above step S308.

In step S309, the IP address of node 1 within the network domain in which node 4 is located is written into a list of remote addresses of node 4 by node 4.

In this implementation, after the connection is established, the IP address of node 1 is further written back to the list of remote addresses of node 4 by node 4. In this way, node 4 is enabled to gradually improve the list of remote addresses of node 4, achieving an automatic write-back of the list of remote addresses, which reduces the user's configuration of the list of remote addresses, and improves the user experience.

Figure 4:
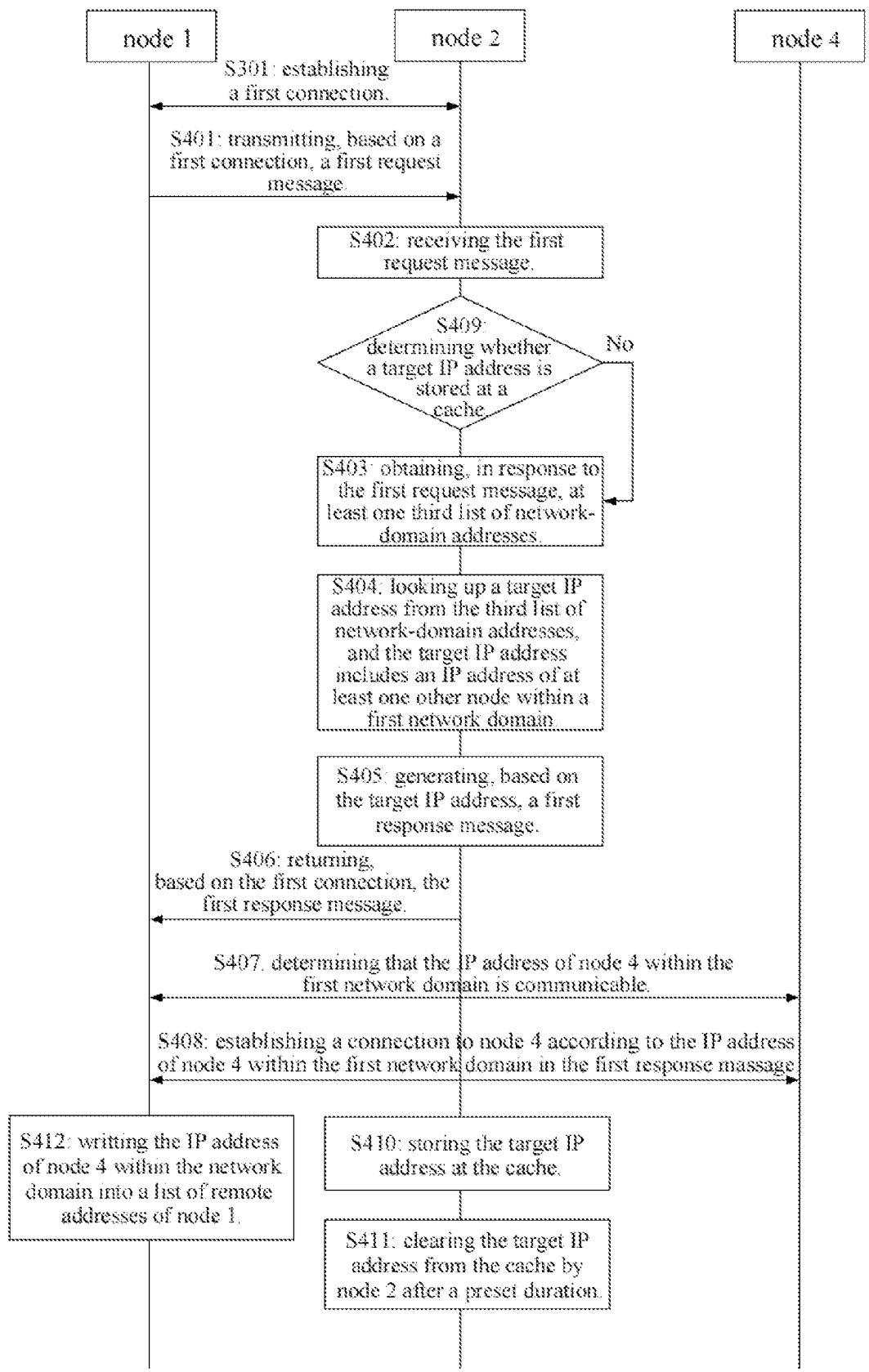
FIG. 4 is a flow diagram of a method for communication according to another embodiment of the present application.

In one embodiment, a node may further adopt a PULL mode for node discovery while adopting the PUSH mode. Specifically, referring to FIG. 4, a method for communication provided in this embodiment may include steps S401 to S412.

In step S401, a first request message is transmitted by node 1 to node 2 based on a first connection.

The first request message is also referred to as a first peer request. The first request message is used to instruct node 2 to generate a first response message. The first response message is also referred to as a first peer response.

In step S402, the first request message is received by node 2.

In step S403, at least one third list of network-domain addresses is obtained by node 2 in response to the first request message. The third list of network-domain addresses is used to characterize the IP addresses of the nodes, among the neighbor nodes of node 2, located in the first network partition within at least one network domain.

The list of network-domain addresses of node 2 may be pre-stored in node 2, and the list of network-domain addresses of each neighbor node of node 2 may also be stored in node 2. The third list of network-domain addresses of node 2 is obtained by selecting the list of network-domain addresses of a node located in the first network partition from the lists of network-domain addresses of the neighbor nodes of node 2. The source of each list of network-domain addresses stored in node 2 will be described in subsequent implementations.

In step S404, a target IP address is looked up from the third list of network-domain addresses by node 2. The target IP address is the IP address of the node within the first network domain, and the target IP address includes the IP address of at least one other node within the first network domain.

Specifically, each third list of network-domain addresses is looked up through node 2 one by one, and the target IP address is obtained by picking out the IP address presented within the first network domain from all lists of network-domain addresses.

In step S405, a first response message is generated by node 2 based on the target IP address.

In step S406, the first response message is returned by node 2 to node 1 based on the first connection.

In step S407, it is determined by node 1 whether the IP address of another node within the first network domain in the first response message (such as node 4 in FIG. 4) is communicable.

The specific process and beneficial effects of this step are similar to the above step S307, which will not be repeated here.

If it is determined by node 1 that the IP address of the other node within the first network domain in the first response message is not communicable, then the IP address is discarded by node 1. If it is determined by node 1 that the IP address is communicable, then the step S408 is performed.

In step S408: a connection is established by node 1 with other node based on the IP address of the other node within the first network domain in the first response message.

For example, in FIG. 1, after the connection between node 1 and node 2 is established, the first request message is transmitted by node 1 to node 2, and the first response message is generated by node 2 in response to the first request message. Specifically, the neighbor nodes of node 2 include node 1, node 3, and node 5. Since node 1 and node 2 have already established a connection in step S301, the list of network-domain addresses of node 1 is a duplicate message and does not need to be sent. And node 5 does not belong to the first network partition, thus, the list of network-domain addresses of node 5 is also not to be sent. Therefore, the list of network-domain addresses of node 3 is served as the third list of network-domain addresses for node 1, and the IP address of node 3 within the first network domain is obtained by looking up the IP address within the first network domain from the third list of network-domain addresses. The IP address of node 3 within the first network domain is served as the target IP address for node 2, and the first response message is generated by node 2 based on the target IP, and then the first response message is transmitted by node 2 to node 1. Based on the IP address of node 3 within the first network domain in the first response message, a connection between node 1 and node 3 is established by node 1.

Through the above process, node 1 is able to achieve the discovery and connection to node 3. And in the above process, node 1 obtains the IP address of node 3 by pulling from node 2, and the above node-discovery process is a node discovery in the form of PULL. In this embodiment, the self-discovery of nodes in the scenario of communication using proxy in the consortium blockchain is achieved through the node discovery technique in the form of PULL, which satisfies the user requirements. Also, the consortium blockchain itself is stricter for node identity verification, the node discovery in the form of PULL can avoid Eclipse attack and Sybil attack, etc., in the consortium blockchain, and has higher security. Moreover, in the method provided in this embodiment, the first response message returned by node 2 to node 1 is obtained from the third list of network-domain addresses, and the third list of network-domain addresses is the list of network-domain addresses of the nodes located in the first network partition among the neighbor nodes of node 2, thus the message returned by node 2 to node 1 does not include messages of other network partitions, thereby realizing the partition isolation of node discovery, which not only satisfies the self-discovery of nodes in the scenario of communication between multiple network partitions in the consortium blockchain, but also the partition isolation of node discovery does not cause confusion in business execution, thus the user requirements can be further satisfied.

In addition, the method provided in this embodiment adopts the PUSH mode for node discovery along with the PULL method for node discovery, and the two methods complement each other, enabling more nodes to be discovered faster and improving the efficiency of node connection. Specifically, when the node discovery in the form of PUSH is adopted, there may be cases where the IP address within the network domain in which some other nodes are located is not configured in the first list of network-domain addresses, or the configured IP address is not communicable, the adopting of the PULL mode enables the IP address of that other node within the first network domain to be obtained and a connection is established with that node by node 1. When the node discovery in the form of PULL is adopted, in case that node 1 belongs to a new network domain and no IP address of any node within the new network domain is stored in node 2, then node 2 cannot return a response to node 1, and the adopting of the PUSH mode in the node discovery can compensate for this.

It should be noted that when the node discovery and connection is performed either through the PUSH mode, the PULL mode, or a combination of the PUSH and PULL modes, if a communicable IP address is found to be already connected, the node may not repeat the operation, i.e., the connection is only performed to the unconnected nodes.

In one embodiment, prior to the above step S403, the method also includes the step S409.

In step S409, it is determined by node 2 whether a target IP address is stored in a predetermined storage location (the following uses cache as an example).

If the target IP address is stored in the cache, then node 2 does not perform any operation.

If the target IP address is not stored in the cache, the above step S403 is performed by node 2, and after the step S404, the method also includes the steps S410 and S411.

In step S410, the target IP address to is stored by the node 2 at the cache.

In step S411, the target IP address is cleared from the cache by node 2 after a preset duration.

That is, each time a target IP address is obtained, this target IP address is stored by node 2 at the cache for a preset duration. If the first request message from the node 1 is received by node 2 again within this preset duration, the node 2 does not return the first response message to the node 1. If the first request message from node 1 is received by the node 2 again after the preset duration, the first request message is returned by node 2 to node 1 according to the above steps S403 to S405. In this way, the redundant messages in the network can be reduced, and the first response message including the target IP address can be transmitted to node 1 again in cases of packet loss or other undeliverable situations during the message transmitting process, ensuring the best delivery of the message.

Optionally, the preset duration may be determined based on a period of transmitting the first request message by node 1, and the specifics of the network environment. For example, if the network environment is good and packet loss rarely occurs, the preset duration may be set longer, much larger than the period of transmitting the first request message. If the network environment is poor and packet loss occurs from time to time, the preset duration may be set shorter, slightly larger than the period of transmitting the first request message.

In one embodiment, after the above step S408, the method also includes the step S412.

In step S412, the list of IP addresses of other nodes within the first network domain in the first response message is written by node 1 into the list of remote addresses of node 1.

In this implementation, after the connection is established, the IP addresses of the other communicable nodes within the first network domain are further written back to the list of remote addresses of node 1 by node 1. In this way, the list of remote addresses of node 1 can be improved gradually, achieving an automatic write-back of the list of remote addresses, which reduces the user's configuration of the list of remote addresses, and improves the user experience.

Figure 5:
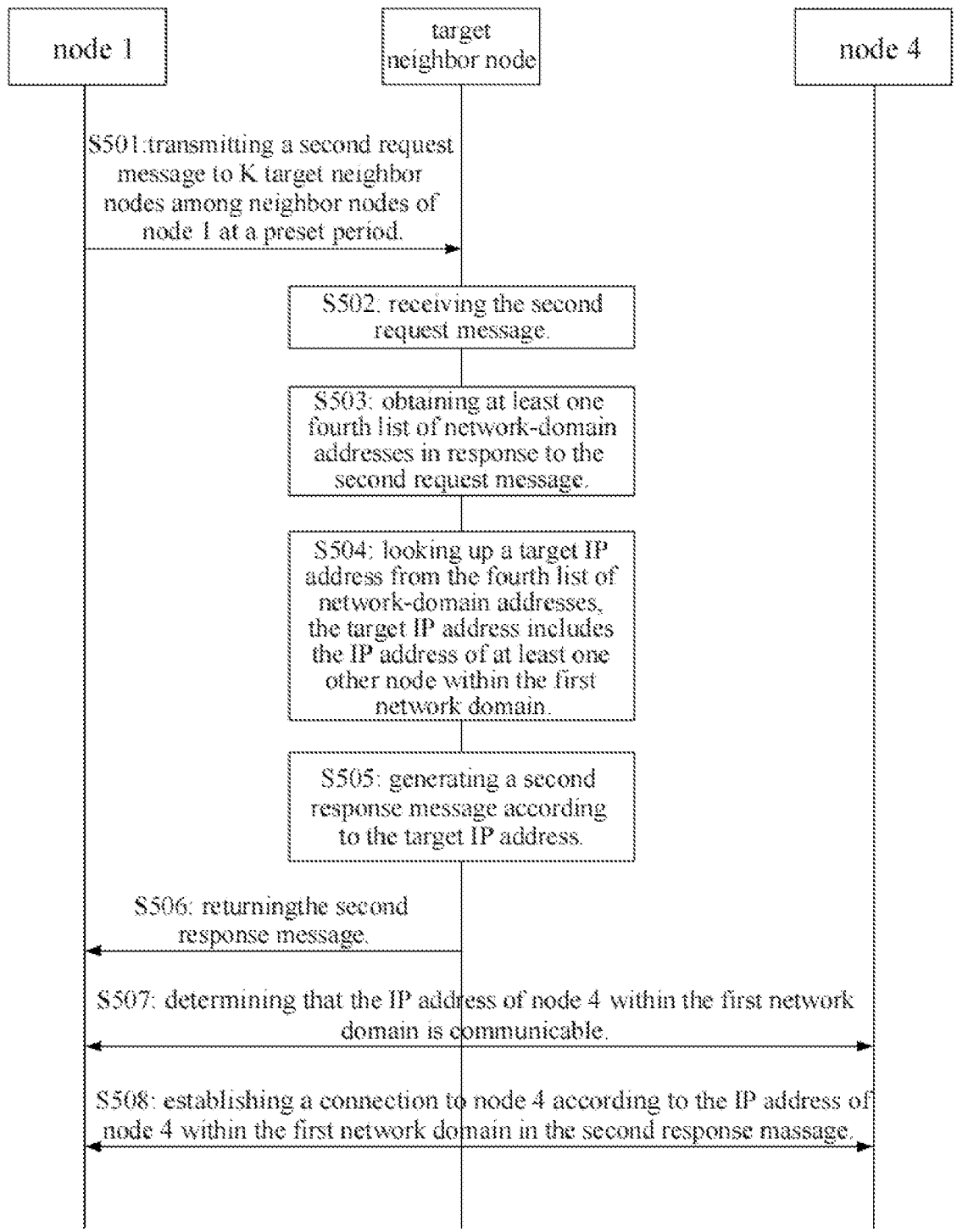
FIG. 5 is a flow diagram of a method for communication according to yet another embodiment of the present application.

Exemplarily, FIG. 5 shows a flow diagram of a method for communication in accordance with yet another embodiment. In this embodiment, a periodic node discovery may be further performed by node 1 after node 1 is joined the first network partition described above.

Specifically, as shown in FIG. 5, the method also includes steps S501 to S508.

In step S501, a second request message is transmitted by node 1 to K target neighbor nodes among the neighbor nodes of node 1 at a preset period.

K is an integer greater than or equal to 1. Optionally, node 1 may randomly select K neighbor nodes as the target neighbor nodes.

In step S502, the second request message is received by the target neighbor node.

In step S503, at least one fourth list of network-domain addresses is obtained by the target neighbor node in response to the second request message.

The fourth list of network-domain addresses is used to characterize the IP addresses of the nodes located in the first network partition within at least one network domain among the neighbor nodes of the target neighbor node.

In step S504, the target IP address is looked up from the fourth list of network-domain addresses by the target neighbor node. The target IP address is an IP address of the node within the first network domain, and the target IP address includes the IP address of at least one other node within the first network domain.

In step S505, a second response message is generated by the target neighbor node according to the target IP address.

In step S506, the second response message is returned by the target neighbor node to node 1.

In step S507, it is determined by node 1 whether the IP addresses of the other nodes within the first network domain in the second response message are communicable.

If it is determined by node 1 that the IP addresses of the other nodes within the first network domain in the second response message are not communicable, then the IP addresses are discarded by node 1. If it is determined by node 1 that the IP addresses are communicable, then the step S508 is performed.

In step S508, connections between node 1 and other nodes (such as, node 4 in FIG. 5) within the first network domain are established based on the IP addresses of the other nodes in the second response message.

In this embodiment, the second request message and the second response message are similar to the first request message and the first response message in the above embodiment, and the steps S502 to S508 are similar to the above steps S402 to S408, which will not be repeated here.

In addition, the target neighbor node and node 1 in this implementation can also further perform the same process as the above steps S409 to S412, and the specific process will not be repeated here.

Also, as in the above embodiment, during a periodic discovery process, if one communicable IP address being discovered is already connected, the node may not repeat the operation, i.e., the connection is only performed to unconnected nodes.

In this implementation, after the node establishes a connection with some of the nodes in the first network partition, the node is discovered again and a connection is established with the unconnected node through the periodic node discovery. The periodic node discovery enables timely discovery of nodes that were not discovered earlier due to message loss, temporary node downtime, etc., to establish connections to those nodes, thereby enabling the node discovery to be more comprehensive and the network establishment to be more comprehensive and accurate.

The process of obtaining the list of network domain addresses stored in each node in the to-be-joined network partition is illustrated below with reference to exemplary embodiments.

Optionally, the lists of network-domain addresses of nodes may be exchanged with each other when establishing a connection and the lists of network-domain addresses are updated after joining the network. In the following, the process of exchanging the lists of network-domain addresses of node 2 and node 3 during a connection establishment between node 2 and node 3 is illustrated as an example, and other nodes are similar and will not be repeated here.

Figure 6:
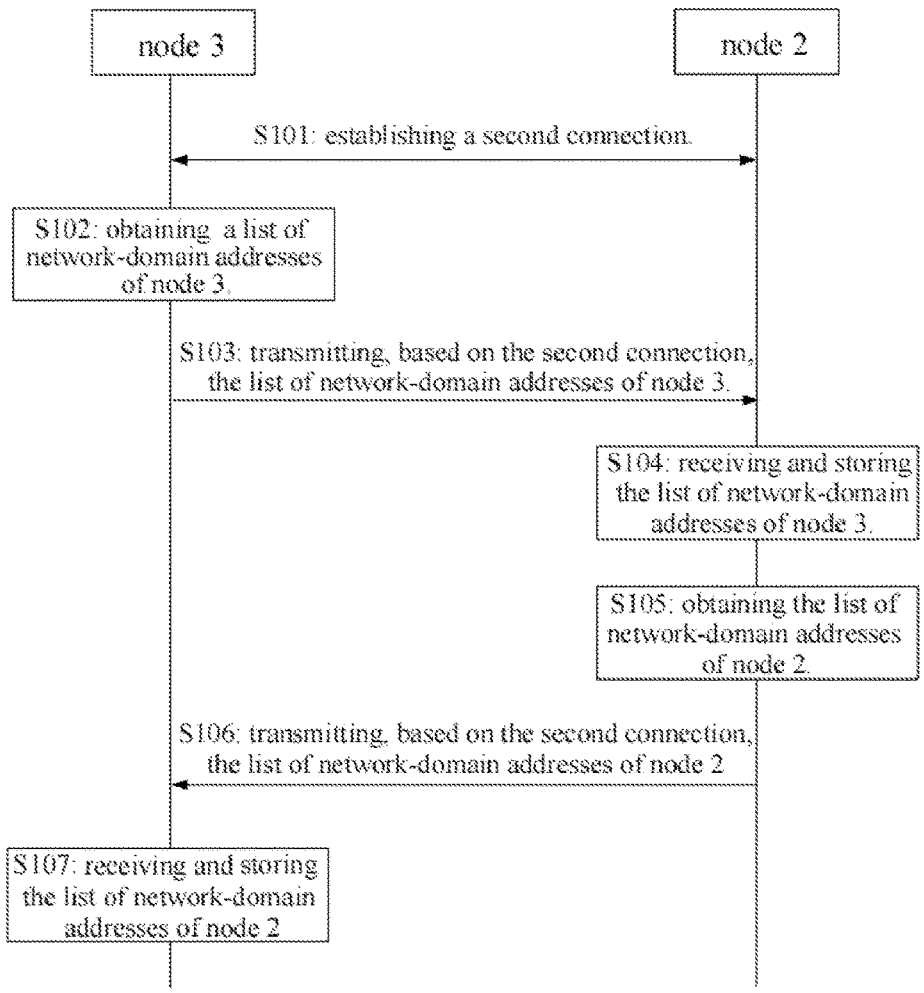
FIG. 6 is a flow diagram of a method for obtaining a list of network-domain addresses according to yet another embodiment of the present application.

Exemplarily, FIG. 6 illustrates a flow diagram of a process of obtaining a list of network-domain addresses provided in an embodiment of the present application, as shown in FIG. 6, the process includes steps S101 to S107.

In step S101, a second connection is established between node 3 and node 2, where node 3 is located in the third network domain and node 2 is located in the second network domain.

The process of establishing the second connection between node 3 and node 2 is similar to the process of establishing the first connection between node 1 and node 2, which will not be repeated here.

It should be noted that node 3 and node 2 may experience a node connection collision during the process of connection. When the node connection collision occurs, according to a predetermined rule, one of the two nodes will drop the connection request and receive the connection request transmitted by the opposite node, thereby establishing the connection. In the embodiments of the present application, in case that the node connection collision is occurred, the connection initiator is one of the two nodes that initiates the connection request and successfully establishes the connection; the corresponding connection receiver is the other one of the two nodes that receives and responds to the connection request and successfully establishes the connection.

For the sake of illustration, in the following embodiment, node 3 is the connection initiator of the second connection, and node 2 is the connection receiver of the second node.

In step S102, a list of network-domain addresses of node 3 is obtained by node 3. The list of network-domain addresses of node 3 is used to characterize the IP address of node 3 within at least one network domain, and the list of network-domain addresses of node 3 includes at least the IP address of node 3 within the third network domain.

In step S103, the list of network-domain addresses of node 3 is transmitted by node 3 to node 2 based on the second connection.

It can be understood that node 3 may store the list of network-domain addresses of node 3 in a memory of node 3 while transmitting the list of network-domain addresses of node 3.

In step S104, the list of network-domain addresses of node 3 is received and stored by node 2.

In step S105, the list of network-domain addresses of node 2 is obtained by node 2. The list of network-domain addresses of node 2 is used to characterize the IP address of node 2 within at least one network domain, and a second list of network-domain addresses includes at least the IP address of node 2 within the second network domain.

In step S106, the list of network-domain addresses of node 2 is transmitted by node 2 to node 3 based on the second connection.

It can be understood that node 2 may store the list of network-domain addresses of node 2 in a memory of node 2 while transmitting the list of network-domain addresses of node 2.

In step S107, the list of network-domain addresses of node 2 is received and stored by node 3.

Through the above process, node 3 exchanges the list of network-domain addresses with node 2. In this way, the list of network-domain addresses of node 3 and the list of network-domain addresses of node 2 are stored in both node 3 and node 2.

The above process can use multiple IP addresses for each node to communicate with different domains without specifying that a node can only use one IP address, which enables the networking of the consortium blockchain to be more flexible and can meet the user's demand of using proxy to map the internal and external URLs of nodes in the consortium blockchain for internal and external network communication, such that the user experience can be improved.

The above is the process of exchanging list of network-domain addresses between node 3 and node 2. It can be understood that any two nodes in the communication system with neighbor relationship can exchange their respective lists of network-domain addresses through the above process. In this way, each node in the communication system can keep the list of network-domain addresses of this node and the list of network-domain addresses of each neighbor node of this node, so that each node can be informed of the IP address for communication with the neighbor node, thus facilitating the above-mentioned node discovery process.

In one embodiment, when node 3 is the connection initiator in the second connection and node 2 is the connection receiver in the second connection, the IP address of node 2 within the third network domain in the list of network-domain addresses of node 2 can also be obtained by dynamic write-back. Specifically, while transmitting the list of network-domain addresses of node 3 to node 2, node 3 transmits the IP address of node 2 in the list of remote addresses of node 3 (referred to as a second IP address, hereinafter) to node 2 as well.

Figure 7:
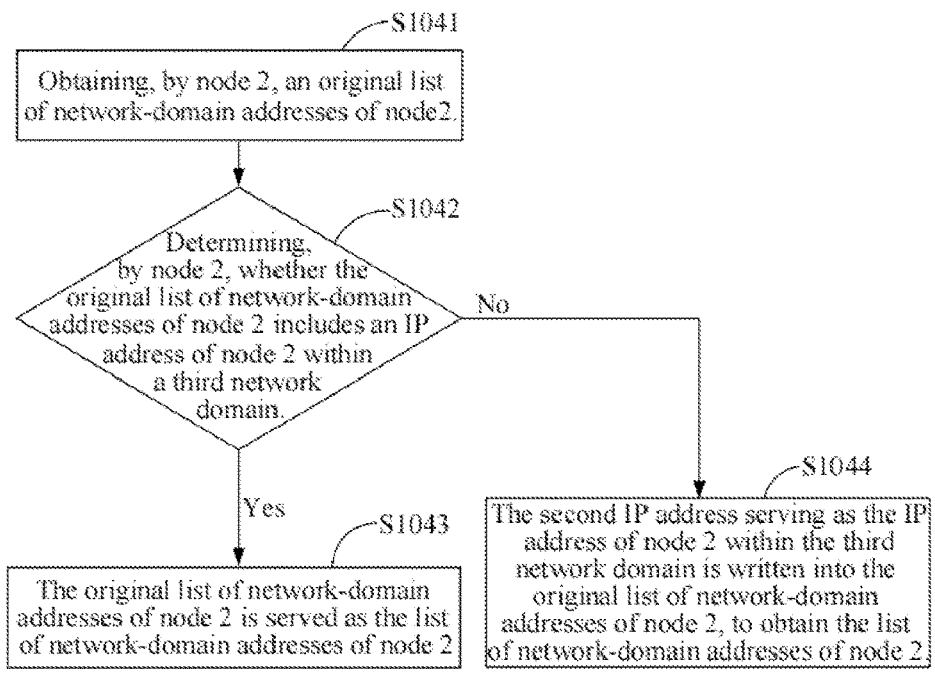
FIG. 7 is a flow diagram of a method for obtaining a list of network-domain addresses of node 2 according to an embodiment of the present application.

On this basis, referring to FIG. 7, the step S104 of obtaining, by node 2, a list of network domain addresses of node 2 specifically includes steps S1041 to S1044.

In step S1041, an original list of network domain addresses of node 2 is obtained by node 2.

Optionally, the original list of network domain addresses of node 2 may include IP addresses of node 2 within the third network domain. Optionally, the IP address of node 2 within the third network domain of node 2 may also not be included in the original list of network-domain addresses of node 2, the reasons may be that the user has not configured the IP address, etc.

In step S1042, it is determined by node 2 whether the original list of network-domain addresses of node 2 includes the IP address of node 2 within the third network domain.

If the IP address of node 2 within the third network domain is included, then the step S1043 is performed.

If the IP address of node 2 within the third network domain is not included, then the step S1044 is performed.

In step S1043, the original list of network-domain addresses of node 2 is served as the list of network-domain addresses of node 2.

In step S1044, the second IP address serving as the IP address of node 2 within the third network domain is written to the original list of network-domain addresses of node 2, to obtain the list of network-domain addresses of node 2.

It can be understood that since node 3 is connected to node 2 through the second IP address, then it means that the second IP address is available for connection by node 3 within the third network domain, then the second IP address can be served as the IP address of node 2 within the third network domain.

For example, it is assumed that the list of remote addresses of node 3 is configured with the IP address of node 2 (i.e., the second IP address), which is 117.11.10.2:50012, and the original second list of network-domain addresses of node 2 is: {domain2:10.10.1.2:50012}. If it is determined by node 2 that the original list of network-domain addresses of node 2 does not include the IP address of node 2 within the third network domain, then the second IP address is written by node 2 to the original list of network-domain addresses of node 2, to obtain the final list of network-domain addresses of node 2, that is: {domain2:10.10.1.2:50012, domain3:117.11.10.2: 50012}.

In this implementation, for a receiver node, the list of network domains addresses of the receiver node is obtained by dynamic write-back. In this way, the list of network domain addresses can be obtained without further configuration by the user for omitted configurations, or for new network domains and nodes added to the communication system, thus simplifying the configuration process for the user and further improving the user experience.

Figure 8:
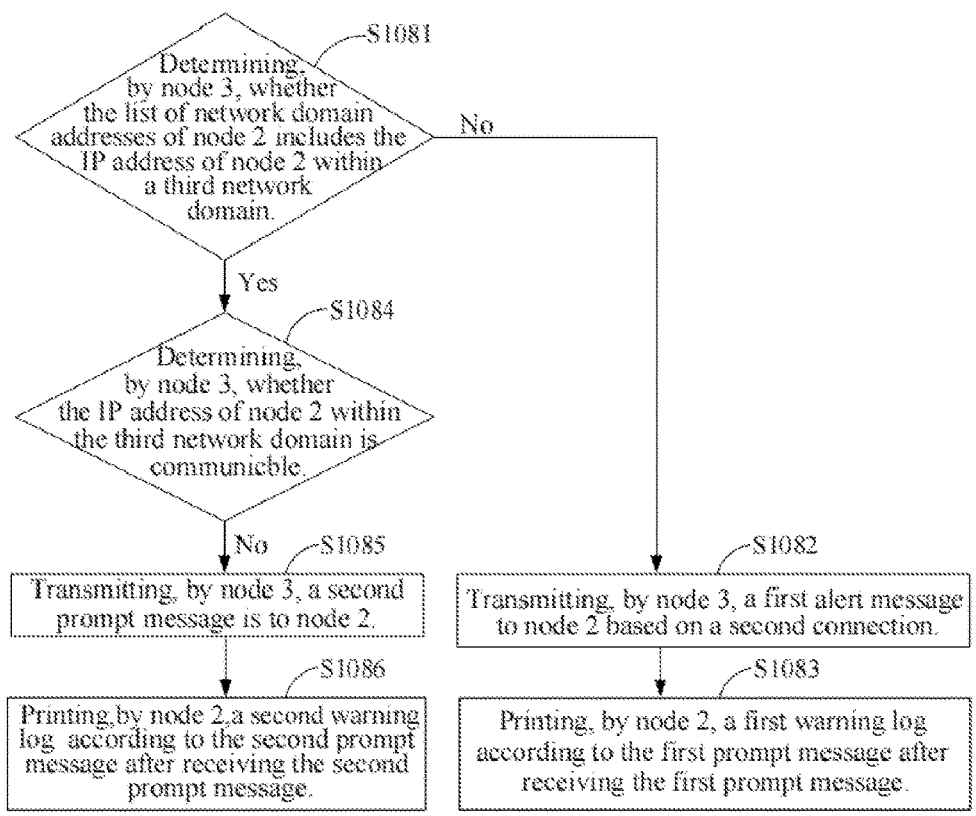
FIG. 8 is a flow diagram of a method of checking a list of network-domain addresses according to an embodiment of the present application.

In one embodiment, after node 3 and node 2 have exchanged the lists of network-domain addresses, node 3 and node 2 can separately check each other's lists of network-domain addresses. Specifically, as shown in FIG. 8, the method may also include steps S1081 to S1086.

In step S1081, it is determined by node 3 whether the list of network domain addresses of node 2 includes the IP address of node 2 within the third network domain.

If no, then the step S1082 is performed.

If yes, then the step S1084 is performed.

In step S1082, a first alert message is transmitted by node 3 to node 2 based on the second connection, and the first alert message is used to prompt node 2 to print a first warning log.

In step S1083, the first warning log is printed by node 2 according to the first prompt message after the first prompt message is received by node 2. The first warning log is used to prompt the user that the IP address of node 2 within the third network domain is not included in the list of network-domain addresses of node 2.

By generating the first warning log, the user can be informed that the IP address of node 2 within the third network domain is not included in the list of network domain addresses of node 2, so that the user can configure or perform other operations on the IP address as needed. This implementation increases the interaction between the node and the user and allows the user to be informed of the list of network-domain addresses, thus allowing the user to improve the list of network-domain addresses of node 2, which in turn allows for better subsequent communication and further improves the user experience.

In step S1084, it is determined by node 3 whether the IP address of node 2 within the third network domain is communicable.

If yes, then the process ends.

If not, then the step S1085 is performed.

In step S1085, a second prompt message is transmitted by node 3 to node 2. The second prompt message is used to prompt node 2 to print a second warning log.

In step S1086, the second warning log is printed by node 2 according to the second prompt message after the second prompt message is received by node 2. The second warning log is used to prompt the user that the IP address of node 2 within the third network domain is not communicable.

The generation of the second warning log enables the user to be informed that the IP address of node 2 within the third network domain is not communicable and that there may be configuration errors or connection problems, thereby facilitating the user to modify the IP address or check the connection, etc., as needed. This implementation increases the interaction between the node and the user and ensures the correctness of the list of network-domain addresses of node 2, thus ensuring the accuracy and reliability of communication in the consortium blockchain and further improving the user experience.

Meanwhile, node 2 may also check the list of network-domain addresses of node 3 transmitted by node 3 in a similar process to that of node 3 checking the list of network-domain addresses of node 2, including the following method:

In this method, it is determined by node 2 whether the list of network-domain addresses of node 3 includes the IP address of node 3 within the second network domain.

If the IP address of node 3 within the second network domain is not included in the list of network domain addresses of node 3, then a third alert message is transmitted by node 2 to node 3 based on the second connection, and the third alert message is used to prompt node 3 to print a third warning log; the third warning log is printed by node 2 according to the third alert message after the third alert message is received by node 2, and the third warning log is used to prompt the user that the list of network-domain addresses of node 3 does not include the IP address of node 3 within the second network domain.

If the IP address of node 3 within the second network domain is included in the list of network domain addresses of node 3, then it is determined by node 2 whether the IP address of node 3 within the second network domain is communicable.

If it is determined by node 2 that the IP address of node 3 within the second network domain is communicable, then the process is ended. If it is determined by node 2 that the IP address of node 3 within the second network domain is not communicable, then a fourth prompt message is transmitted by node 2 to node 3, and the fourth prompt message is used to prompt node 3 to print a fourth warning log. The fourth warning log is printed by node 3 according to the fourth prompt message after the fourth prompt message is received by node 3, and the fourth warning log is used to prompt the user that the IP address of node 3 within the second network domain is not communicable.

The specific process and beneficial effects of node 2 checking the list of network-domain addresses of node 3 are described in node 3 checking the list of network-domain addresses of node 2, and will not be repeated here.

Figure 9:
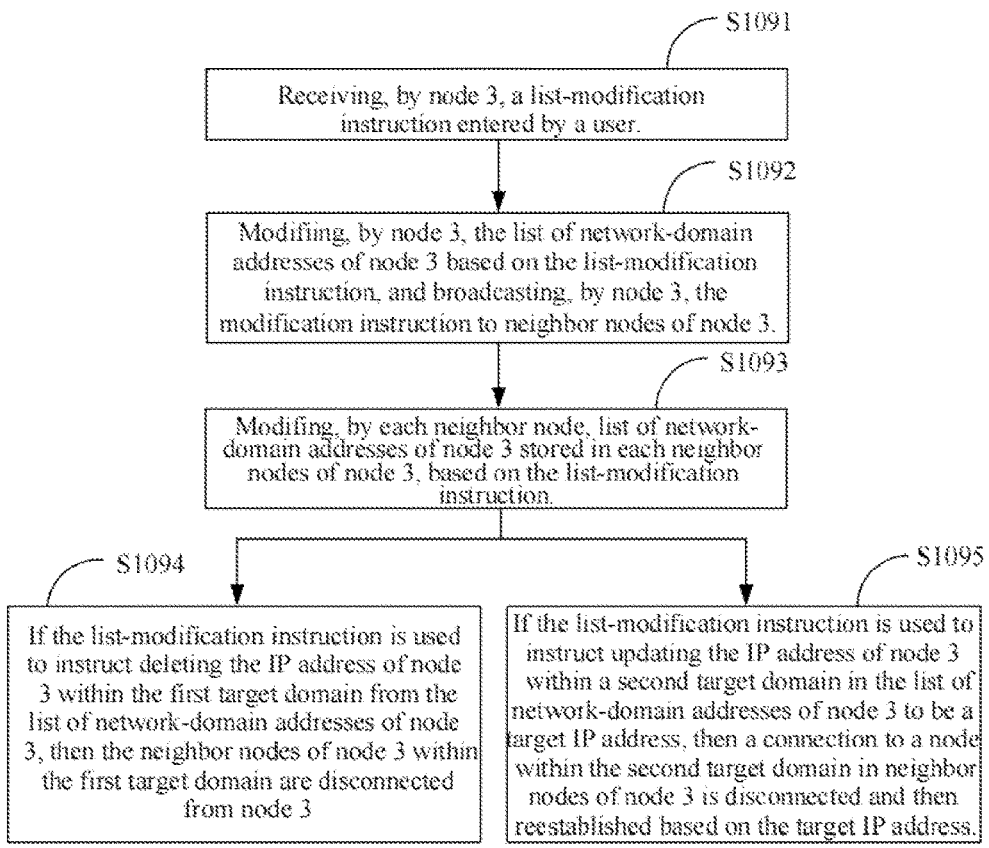
FIG. 9 is a flow diagram of a method for dynamically modifying a list of network-domain addresses according to an embodiment of the present application.

In one embodiment, when a new organization (i.e., a node within a certain network domain) joins the communication system, or an organization leaves the communication system, or the IP address of a node within a certain or several network domains is incorrectly configured, or the configuration is missed, etc., the relevant nodes in the communication system can dynamically modify the list of network-domain addresses based on the user's modification instructions, and the connection statuses of the nodes in the network are updated, i.e., the communication between nodes is managed. In an exemplary embodiment, referring to FIG. 9, a modification command is received by node 3 in the communication system. As shown in FIG. 9, a method for communication in a consortium blockchain may also include steps S1091 to S1095.

In step S1091, a list-modification instruction entered by the user is received by node 3. The list-modification instruction is used to indicate that the list of network domain addresses of the node 3 needs to be modified.

Optionally, the list-modification instruction may include a modification type and a modification information, etc. The modification type may be "add", "update" or "delete". The modification information may include a name of the network domain, an IP address, etc., that need to be modified.

In this embodiment, the application scenario for the list-modification instruction having modification type "add" may be, for example, that based on the third warning log in the above embodiment, a list-modification instruction is sent by the user to node 3, that instructs to add the IP address of node 3 within the second network domain into the list of network-domain addresses of node 3. Alternatively, if a new node is added to the communication system within a new network domain C, and the new node is a neighbor node of node 3, then a list-modification instruction is sent by the user to node 3, that instructs to add the IP address of node 3 within the new network domain C to the list of network-domain addresses of node 3.

The application scenario for the list-modification instruction having modification type "update" may be, for example, that based on the fourth warning log in the above embodiment, a list-modification instruction is sent by the user to node 3, that instructs to update the IP address of node 3 within the second network domain in the list of network-domain addresses of node 3 to a new IP address.

The application scenario for the list-modification instruction having the modification type "delete" may be, for example, that each node within a network domain D is no longer connected to node 3, and a list-modification instruction is sent by the user to node 3, that instructs to delete the IP address of node 3 within network domain D from the list of network-domain addresses of node 3.

Optionally, the modification type may be indicated by adding character information after the modification information, e.g., "-I" for adding, "-U" for updating, and "-D" for deleting. In other embodiments, the modification type may also be indicated in other ways, for example, {update: {domain2: 117.11.10.1:50011}} indicates updating the IP address within the second network domain to 117.11.10.1:50011. The modification type and the specific form of the list-modification instruction will not be limited in here In step S1092, the list of network-domain addresses of node 3 is modified by node 3 based on the list-modification instruction, and the modification instruction is broadcast by node 3 to the neighbor nodes of node 3.

As described in the above embodiment, node 3 and each neighbor node of node 3 exchange the list of network-domain addresses, such that each node stores the list of network-domain addresses of this node and the list of network-domain addresses of each neighbor node of this node. After node 3 modifies the list of network-domain addresses of node 3 stored by this node, node 3 needs to further inform each neighbor node of the list-modification instruction so that the neighbor nodes update the list of network-domain addresses of node 3 synchronously.

In step S1093, lists of network-domain addresses of node 3 stored in the neighbor nodes of node 3 are respectively modified by each neighbor node based on the list-modification instruction.

Figure 10:
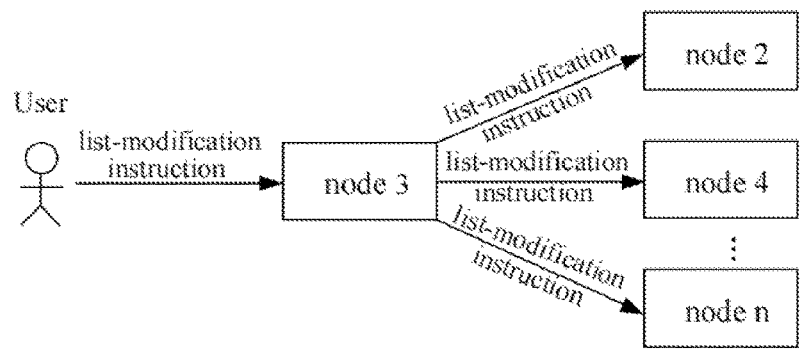
FIG. 10 is a schematic diagram of a process for dynamically modifying a list of network-domain addresses according to an embodiment of the present application.

Exemplarily, FIG. 10 illustrates a schematic diagram of the process of dynamically modifying the list of network-domain addresses. The list of network-domain addresses of node 3 is modified after receiving the list-modification instruction from the user, and the modification instruction is further broadcast by node 3 to the neighbor nodes (i.e., node 2, node 4, and . . . node n) of node 3. The lists of network domain addresses of node 3 stored in node 2, node 4, and . . . node n, are modified, respectively.

In some embodiments, node 3 may also broadcast the modified list of network-domain addresses of node 3 to each neighbor node of node 3 to achieve an updating of the list of network-domain addresses of node 3 stored in each neighbor node.

In this embodiment, the list-modification instruction is only broadcast to each neighbor node of node 3, which can reduce the broadcasting of redundant messages and reduce the network blockage and other situations, thereby improving the efficiency of network communication and ensuring a high efficiency of network communication.

In step S1094, if the list-modification instruction is used to instruct deleting the IP address of node 3 within the first target domain from the list of network-domain addresses of node 3, then the neighbor nodes of node 3 within the first target domain are disconnected from node 3.

In other words, if the modification type in the list-modification instruction is "delete" and the modification information is the IP address of node 3 within the first target domain, each node within the first target domain is disconnected from node 3 after receiving the instruction broadcast by node 3.

For example, the list-modification instruction is used to instruct deleting "domain2:117.10.11.1:50012" from the list of network-domain addresses of node 3, i.e., to delete the IP address 117.10.11.1:50012 of node 3 within the second network domain. Then, the nodes (including node 2) within the second network domain, after receiving this list-modification instruction broadcast by node 3, delete this information from the respective stored list of network-domain addresses of node 3, and are disconnected from node 3.

In step S1095, if the list-modification instruction is used to instruct updating the IP address of node 3 within the second target domain in the list of network-domain addresses of node 3 to be the target IP address, then the node within the second target domain of the neighbor node of node 3 is disconnected from node 3 and a connection to node 3 is re-established based on the target IP address.

In other words, if the modification type in the list-modification instruction is "update" and the modification information is to modify the IP address of node 3 within the second target domain to be the target IP address, and then each node within the second target domain, after receiving the list-modification instruction broadcast by node 3, are disconnected from node 3, and then re-connected to node 3 using the target IP address.

For example, the original list of network-domain addresses of node 3 is: {domain2:117.10.11.1:50012, domain3: 10.10.1.1:50011}, and the list-modification instruction is {update: {domain2: 117.11.10.1:50011}}, which is used to instruct updating the IP address of node 3 within the second network domain in the list of network domain addresses of node 3 to be 117.11.10.1:50011. Then, node 2 and node 5 within the second network domain, upon receiving this list-modification instruction broadcast by node 3, update this information in the list of network-domain addresses of node 3 stored by each of them, thus node 2 and node 5 are disconnected from node 3, and then are reconnected to node 3 using IP address 117.11.10.1: 50011 respectively.

In this embodiment, in the case of receiving the list-modification instruction entered by the user, the list of network-domain addresses of node 3 is modified by node 3 based on this list-modification instruction. Meanwhile, the list-modification instruction is broadcast by node 3 to each neighbor node of node 3 to cause each neighbor node of node 3 to update their respective stored lists of network-domain addresses of node 3, thereby causing the lists of network-domain addresses of node 3 stored in each node in the communication system to be updated, ensuring the consistency of such lists of network-domain addresses in each node, thereby ensuring the accuracy and reliability of the communication, further enabling the accuracy of each list of network-domain addresses obtained during node discovery and improving the accuracy of node discovery. On the other hand, the method provided in this embodiment can dynamically configure IP addresses, modify lists of network-domain addresses, and manage node communications while the communication system is running, without having to bring the nodes down and reboot, thereby simplifying the process of network communication, ensuring network stability, saving user's time, and further improving the user experience. In addition, the above process of dynamically modifying the list of network-domain addresses is not perceptible to the user, that is, the above process is transparent to the user, which further improves the user experience. Moreover, each neighbor node of node 3 updates the connection status with node 3 according to the list update instruction, thus ensuring the accuracy of the node connection, the reliability of the network communication, and further improving the user experience.

It should be noted that the above embodiments are mostly illustrated in the scenario where the method for communication in a consortium blockchain is applied to the mapping of internal and external URLs of nodes for internal and external network communication by proxy, however, in addition to this, the method provided in this embodiment may also be applied to any situation that may result in a node having multiple IP addresses for communication with nodes in multiple network domains, and the present application does not limit this.

It should be understood that although the individual steps in the flowchart of the above-described embodiment are shown sequentially as indicated by the arrows, these steps are not necessarily performed sequentially in the order indicated by the arrows. Unless expressly specified otherwise, there is no strict sequential limitation on the execution of these steps, and the steps may be executed in other orders. Moreover, at least some of the steps in the flowchart may include multiple sub-steps or multiple phases, which are not necessarily executed at the same time, but may be executed at different times, and the order of execution of these sub-steps or phases is not necessarily sequential, but may be executed alternately or alternatively with other steps or at least some of the sub-steps or phases of other steps.

Figure 11:
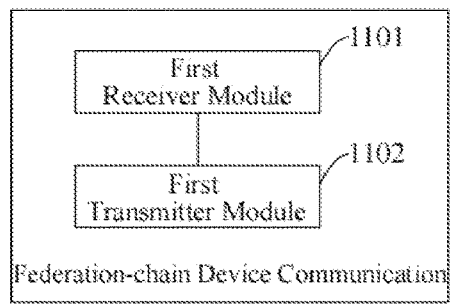
FIG. 11 is a block diagram of a structure of a device for communication in a consortium blockchain according to an embodiment of the present application.

FIG. 11 illustrates a block diagram of a structure of a device for communication in a consortium blockchain provided by an embodiment of the present application, the device for communication in a consortium blockchain may be a second node (i.e., node 2). As shown in FIG. 11, the device for communication in a consortium blockchain provided by this embodiment may include a first receiver module 1101 and a first transmitter module 1102.

The first receiver module 1101 is configured to receive a first information from a first node via a first connection with the first node. The first connection includes a logical connection, and a connection initiator of the first connection is the first node. The first information includes an address of the first node within a target network domain, the target network domain is a network domain in which at least one other node is located, the at least one other node refers to a node other than a second node in a network partition to be joined by the first node. The address of the first node within the target network domain is used by the first node to establish a connection with the at least one other node.

The first transmitter module 1102 is configured to transmit a first information to the at least one other node.

In one embodiment, the first node belongs to a first network domain and the first receiver module 1101 is also configured to receive a first request message from the first node. The first request message is used to request an address of the at least one other node within the first network domain. The address of the at least one other node within the first network domain is used by the first node to establish a connection with the at least one other node. The first transmitter module 1102 is also configured to transmit a first response message to the first node, via the first connection, in response to the first request message. The first response message includes the address of the at least one other node within the first network domain.

In one embodiment, the first transmitter module 1102 is further configured to obtain at least one second information. The second information includes addresses of nodes within one or more network domains of neighbor nodes of the second node that are located in the to-be-joined network partition. A target address is looked up from each second information. The target address is an address of the node within the first network domain, and the target address includes an address of at least one other node within the first network domain address.

In one embodiment, the first transmitter module 1102 is specifically used to look up the target address from the respective second information when it is determined that the target address is not stored in the predetermined storage location.

In one embodiment, the first transmitter module 1102 is also configured to store the target address at a predetermined storage location, and to clear the target address in the predetermined storage location after a preset duration.

the device for communication in a consortium blockchain provided in this embodiment is applied to perform the steps of node 2 in the method for communication in a consortium blockchain provided in the method embodiment of the present application, and has similar technical principles and technical effects of the above-described method embodiment, which will not be repeated here.

Figure 12:
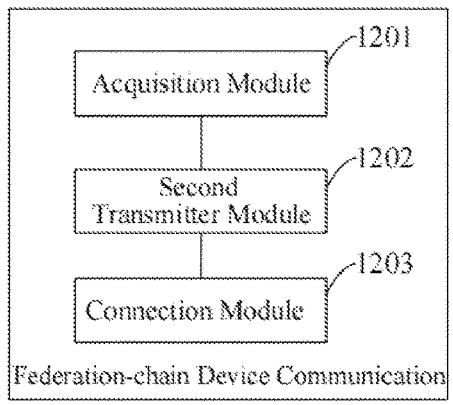
FIG. 12 is a block diagram of a structure of a device for communication in a consortium blockchain according to another embodiment of the present application.

FIG. 12 illustrates a block diagram of a structure of the device for communication in a consortium blockchain provided by an embodiment of the present application, and the device for communication in a consortium blockchain may be a first node (i.e., node 1). As shown in FIG. 12, the device for communication in a consortium blockchain provided by this embodiment may include an acquisition module 1201 and a second transmitter module 1202.

The acquisition module 1201 is configured to obtain a first information. The first information includes an address of the first node within a target network domain. The target network domain is a network domain in which at least one other node is located, and the at least one other node refers to a node other than a second node in the network partition to be joined by the first node. The address of the first node within the target network domain is used by the first node to establish a connection with the at least one other node.

The second transmitter module 1202 is configured to transmit a first information to the second node via the first connection with the second node; the first connection includes a logical connection, and a connection initiator of the first connection is the first node.

In an embodiment, the first node belongs to the first network domain, and the second acquisition module 1201 is also configured to obtain an address of at least one other node within the first network domain. The device also includes a connection module 1203, and the connection module 1203 is configured to establish a connection with at least one other node based on the address of the at least one other node within the first network domain.

In one embodiment, the acquisition module 1201 is specifically configured to transmit a first request message to the target node, and to receive a first response message from the target node. The first request message is used to request the address of the at least one other node within the first network domain from the target node. The target node includes the second node and/or at least one target neighbor node among the neighbor nodes of the first node. The first response message includes at least one other node's address within the first network domain.

In one embodiment, the connection module 1203 is specifically configured to establish a connection with the at least one other node based on the address of the at least one other node within the first network domain when the address of the at least one other node within the first network domain is communicable.

In one embodiment, the acquisition module 1201 is also configured to determine a list of remote addresses of the first node, the list of remote addresses of the first node includes the address of the at least one other node within the first network domain.

In one embodiment, the list of remote addresses of the first node also includes an indication information for indicating whether the address of each other node within the first network domain is communicable.

In one embodiment, the first node belongs to the first network domain, the list of remote addresses of the first node includes an address of a second node, and the connection module 1203 is also configured to establish a first connection with the second node based on the address of the second node.

the device for communication in a consortium blockchain is provided for performing the steps of node 1 in the method for communication in a consortium blockchain provided by the method embodiment of the present application, and has similar technical principles and technical effects of the above-described method embodiment, which will not be repeated here.

An embodiment of the present application also provides a system for communication in a consortium blockchain, which includes a first consortium-chain communication device and a second consortium-chain communication device. The first consortium-chain communication device may be a first node and the second consortium-chain communication device may be a second node. The first consortium-chain communication device is used to perform the steps of node 1 in the method for communication provided by the method embodiment of the present application, and the second consortium-chain communication device is used to perform the steps of node 2 in the method for communication provided by the method embodiment of the present application, and the technical principles and technical effects are similar, references may be made to the method embodiment section, which will not be repeated here.

It can be clearly understood to those skilled in the art that, for the convenience and simplicity of description, the above-mentioned division of each functional unit and module is used as an example only, and in practice, the above-mentioned functions may be assigned to different functional units and modules as needed, i.e., the internal structure of the device is divided into different functional units or modules to accomplish all or part of the above-mentioned functions. Each functional unit, module in the embodiment can be integrated in a processing unit, or each unit can physically exist separately, or two or more units can be integrated in a single unit, and the above integrated unit may be implemented either in the form of hardware or in the form of software functional units. In addition, the specific names of the functional units and modules are only for the purpose of mutual distinction and are not used to limit the protection scope of the present application. For specific working process of the units and modules in the above system, references may be made to the corresponding process in the aforementioned method embodiment, which will not be repeated here.

Figure 13:
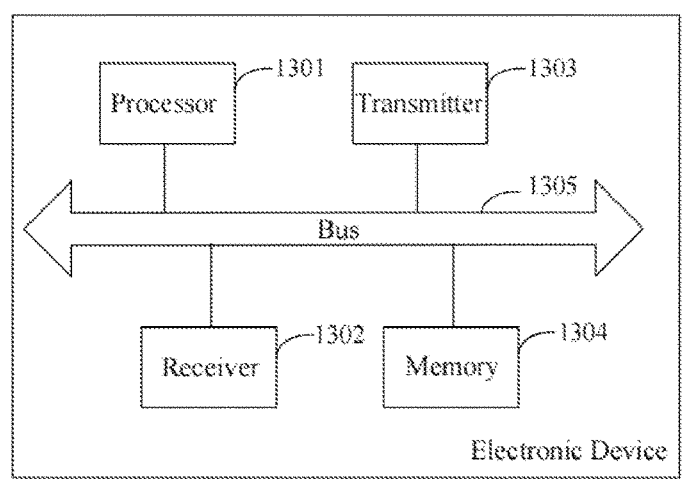
FIG. 13 is a schematic structural diagram of an electronic device according to an embodiment of the present application.

Referring to FIG. 13, an embodiment of the present application also provides an electronic device, which may be a first consortium-chain communication device in the first node of the above embodiments or a second consortium-chain communication device in the second node of the above embodiments. The electronic device includes: a processor 1301, a receiver 1302, a transmitter 1303, a memory 1304, and a bus 1305. The processor 1301 includes one or more processing cores, and the processor 1301 performs various functional applications as well as information processing by running software programs as well as modules. The receiver 1302 and transmitter 1303 may be implemented as a communication component, which may be a baseband chip. The memory 1304 is connected to the processor 1301 via the bus 1305. The memory 1304 may be used to store at least one program instruction and the processor 1301 is used to execute at least one program instruction to implement the solutions of the above embodiments. The implementation principles and effects are similar to those of the method-related embodiments described above, which will not be repeated here.

When the electronic device is turned on, the processor can read the software program in the memory, interpret and execute the instructions of the software program, and process the data of the software program. When data needs to be transmitted through the antenna, the processor performs baseband processing of the data to be transmitted and outputs the baseband signal to the control circuit, the control circuit performs RF processing of the baseband signal and transmits the RF signal outward in the form of electromagnetic waves through the antenna. The control circuit receives the RF signal through the antenna, converts the RF signal into a baseband signal, and outputs the baseband signal to the processor, when data is transmitted to the electronic device, and then the processor converts the baseband signal into data and processes the data.

It will be appreciated by those skilled in the art that for ease of illustration, only a memory and a processor are shown in FIG. 13. In an actual electronic device, multiple processors and memories may exist. The memory may also be referred to as a storage medium or a storage device, etc., and the embodiments of the present application are not limited in this regard.

As an optional implementation, the processor may include a baseband processor and a central processor. The baseband processor is used primarily for processing communication data and the central processor is used primarily for executing software programs and processing data from the software programs. It can be understood for a person skilled in the art that the baseband processor and the central processor may be integrated in a single processor, or may be separate processors, interconnected by techniques such as buses. It can be understood for those of skill in the art that the electronic device may include multiple baseband processors to accommodate different network standards, that the electronic device may include multiple central processors to enhance its processing capability, and that the various components of the electronic device may be connected via various buses. The baseband processor may also be expressed as a baseband processing circuit or baseband processing chip. The central processor may also be expressed as a central processing circuit or a central processing chip. The functions for processing the communication protocol and the communication data may be built into the processor or stored in memory in the form of a software program that is executed by the processor to implement the baseband processing functions. The memory may be integrated in the processor or independent of the processor. The memory includes a cache, which can hold frequently accessed data/instructions.

In embodiments of the present application, the processor may be a general-purpose processor, a digital signal processor, a specialized integrated circuit, a field programmable gate array or other programmable logic device, a discrete gate or transistor logic device, or a discrete hardware component that can implement or perform each of the methods, steps, and logic block diagrams disclosed in the embodiments of the present application. The general-purpose processor may be a microprocessor or any conventional processor, etc. The steps of the method disclosed in combination with the embodiments of the present application can be directly reflected as the execution completion of the hardware processor, or the combination of hardware and software modules in the processor.

In embodiments of the present application, the memory may be non-volatile memory, such as a hard disk drive (HDD) or a solid-state drive (SS), etc., and may also be volatile memory, such as random-access memory (RAM). The memory is any other medium capable of being used to carry or store desired program code in the form of instructions or data structures and capable of being accessed by a computer, which will not be limited here.

The memory in embodiments of the present application may also be a circuit or any other device capable of implementing a storage function for storing program instructions and/or data. The methods provided in the embodiments of the present application may be implemented in whole or in part by software, hardware, firmware, or any combination thereof. When implemented using software, the implementation may be in whole or in part in the form of a computer program product. The computer program product includes one or more computer instructions. Loading and executing the computer program instructions on a computer produces, in whole or in part, a process or function as described in an embodiment of the present application. The computer may be a general-purpose computer, a specialized computer, a computer network, a network device, a user device, or other programmable device. The computer instructions may be stored in a computer-readable storage medium or transmitted from one computer-readable storage medium to another computer-readable storage medium, e.g., the computer instructions may be transmitted from a web site, a computer, a server, or a data center to another website site, computer, server, or data center, via a wire (e.g., coaxial cable, fiber optic, digital subscriber line (DSL), or in a wireless manner (e.g., infrared, wireless, microwave, etc.). The computer-readable storage media may be any available media accessible by a computer or a data storage device such as a server, an integrated data center containing one or more available media. The available media may be magnetic media (e.g., floppy disk, hard disk, magnetic tape), optical media (e.g., digital video disc (DWD)), or semiconductor media (e.g., SSD), etc.

In accordance with an embodiment of the present application, it is also provided a computer readable storage medium, in which a computer program is stored, the computer program when being executed by a processor causes the steps in any of the above method embodiments to be implemented.

The above-described embodiments are used only to illustrate the solutions of the present application, and are not intended to limit the present application. Although the present application is described in detail with reference to the foregoing embodiments, it should be understood by those of ordinary skill in the art that the solution recorded in the foregoing embodiments may also be modified, or some of the features may be equivalent replaced. These modifications or replacements do not make the essence of the corresponding solution deviate from the spirit and scope of the solutions in the embodiments of the present application, and shall all be included within the protection scope of the present application.

What is claimed is:

1. A method for communication, applied to a second node, comprising:
receiving a first information from a first node via a first connection with the first node, wherein the first connection comprises a logical connection, and a connection initiator of the first connection is the first node; wherein the first information comprises an address of the first node within a target network domain, the target network domain is a network domain in which at least one other node is located, and the at least one other node refers to a node other than the second node in a network partition to be joined by the first node; and wherein the address of the first node within the target network domain is used by the first node to establish a connection with the at least one other node; and
transmitting the first information to the at least one other node.

2. The method according to claim 1, wherein the first node belongs to a first network domain, and the method further comprises:
receiving a first request message from the first node, the first request message is used to request for providing an address of the at least one other node within the first network domain, and the address of the at least one other node within the first network domain is used by the first node to establish a connection with the at least one other node; and
transmitting, in response to the first request message, a first response message to the first node, via the first connection, wherein the first response message comprises the address of the at least one other node within the first network domain.

3. The method according to claim 2, wherein, before transmitting, via the first connection, the first response message to the first node, the method further comprises:
- obtaining at least one second information, the second information comprises addresses within one or more network domains of a node among neighbor nodes of the second node being located in the network partition to be joined by the first node; and
- looking up a target address from each of the at least one second information, the target address is an address of the node within the first network domain, and the target address comprises an address of the at least other node within the first network domain.

4. The method according to claim 3, wherein the looking up a target address from each of the at least one second information, comprises:
- looking up the target address from each of the at least one second information when it is determined that the target address is not stored at a predetermined storage location.

5. The method according to claim 4, wherein, after looking up the target address from each of the at least one second information when it is determined that the target address is not stored in the predetermined storage location, the method further comprises:
- storing the target address at the predetermined storage location; and
- clearing the target address in the predetermined storage location after a preset duration.

6. The method according to claim 1, wherein the transmitting the first information to the at least one other node, comprises:
- broadcasting the first information to the at least one other node using a Gossip protocol.

7. An electronic device, comprising: a memory, a processor and a computer program stored in the memory and executable on the processor, wherein the computer program, when being executed by the processor, causes the method as claimed in claim 1, to be implemented.

8. A non-transitory computer readable storage medium, in which a computer program is stored, wherein the computer program, when being executed by a processor, causes the method as claimed in claim 1 to be implemented.

9. A method for communication, applied to a first node, comprising:
- obtaining a first information, wherein the first information comprises an address of the first node within a target network domain; wherein the target network domain is a network domain in which at least one other node is located, the at least one other node refers to a node other than a second node in a network partition to be joined by the first node; and wherein the address of the first node within the target network domain is used by the first node to establish a connection with the at least one other node; and
- transmitting a first information to the second node via a first connection with the second node, wherein the first connection comprises a logical connection, and a connection initiator of the first connection is the first node.

10. The method according to claim 9, wherein the first node belongs to a first network domain, and the method further comprises:
- obtaining an address of the at least one other node within a first network domain; and
- establishing a connection with the at least one other node according to an address of the at least one other node within the first network domain.

11. The method according to claim 10, wherein the obtaining an address of the at least one other node within a first network domain, comprises:
- transmitting a first request message to a target node, the first request message is used to request the target node to provide the address of the at least one other node within the first network domain, and the target node comprises the second node and/or at least one target neighbor node among neighbor nodes of the first node; and
- receiving a first response message from the target node, the first response message comprises the address of the at least one other node within the first network domain.

12. The method according to claim 11, wherein the list of remote addresses of the first node further comprises an indication information for indicating whether the address of each of the at least one other node within the first network domain is communicable.

13. The method according to claim 10, wherein the establishing a connection with the at least one other node according to an address of the at least one other node within the first network domain, comprises:
- establishing the connection with the at least one other node according to the address of the at least one other node within the first network domain when the address of the at least one other node within the first network domain is communicable.

14. The method according to claim 10, wherein, after obtaining the address of the at least one other node within the first network domain, the method further comprises:
- determining a list of remote addresses of the first node, the list of remote addresses of the first node comprises the address of the at least one other node within the first network domain.

15. The method according to claim 9, wherein the first node belongs to a first network domain, a list of remote addresses of the first node comprises an address of the second node, and before transmitting the first information to the second node via the first connection with the second node, the method further comprises:
- establishing the first connection with the second node according to the address of the second node.

16. The method according to claim 9, wherein the first node belongs to a first network domain, the second node is located in a second network domain, the first information comprises an address of the first node within the first network domain, and the method further comprises:
- receiving, via the first connection, a third message from the second node, wherein the third message comprises at least an address of the second node within the second network domain.

17. The method according to claim 9, wherein the method further comprises:
- receiving an information modification instruction; and
- modifying the first information in accordance with the information modification instruction and transmitting the information modification instruction to a neighbor node of the first node.

18. An electronic device, comprising: a memory, a processor and a computer program stored in the memory and executable on the processor, wherein the computer program, when being executed by the processor, causes the method as claimed in claim 9 to be implemented.

19. A non-transitory computer readable storage medium, in which a computer program is stored, wherein the computer program, when being executed by a processor, causes the method as claimed in claim 9 to be implemented.

20. A communication system, comprising:
a second node, wherein the second node is applied to perform operations that comprises:
  receiving a first information from a first node via a first connection with the first node, wherein the first connection comprises a logical connection, and a connection initiator of the first connection is the first node; wherein the first information comprises an address of the first node within a target network domain, the target network domain is a network domain in which at least one other node is located, and the at least one other node refers to a node other than the second node in a network partition to be joined by the first node; and wherein the address of the first node within the target network domain is used by the first node to establish a connection with the at least one other node; and
  transmitting the first information to the at least one other node; and
a first node, wherein the first node is applied to perform operations that comprises:
  obtaining a first information, wherein the first information comprises an address of the first node within a target network domain; wherein the target network domain is a network domain in which at least one other node is located, the at least one other node refers to a node other than a second node in a network partition to be joined by the first node; and wherein the address of the first node within the target network domain is used by the first node to establish a connection with the at least one other node; and
  transmitting the first information to the second node via the first connection with the second node, wherein the first connection comprises the logical connection, and the connection initiator of the first connection is the first node.

* * * * *